US012789376B2

(12) United States Patent
Sawakawa et al.

(10) Patent No.: US 12,789,376 B2
(45) Date of Patent: Nov. 10, 2026

(54) METHOD FOR GENERATING MOVEMENT ROUTE OF ROBOT, MOVEMENT ROUTE GENERATION APPARATUS, ROBOT SYSTEM, AND PROGRAM

(71) Applicant: Kabushiki Kaisha Kobe Seiko Sho (Kobe Steel, Ltd.), Kobe (JP)

(72) Inventors: Fumiaki Sawakawa, Kobe (JP); Masatoshi Hida, Kobe (JP)

(73) Assignee: Kabushiki Kaisha Kobe Seiko Sho (Kobe Steel, Ltd.), Kobe (JP)

( * ) Notice: Subject to any disclaimer, the term of this patent is extended or adjusted under 35 U.S.C. 154(b) by 346 days.

(21) Appl. No.: 18/317,967

(22) Filed: May 16, 2023

(65) Prior Publication Data

US 2023/0398687 A1 Dec. 14, 2023

(30) Foreign Application Priority Data

Jun. 10, 2022 (JP) ................................ 2022-094605

(51) Int. Cl.
*B25J 9/16* (2006.01)

(52) U.S. Cl.
CPC .................................. *B25J 9/1664* (2013.01)

(58) Field of Classification Search
None
See application file for complete search history.

(56) References Cited

U.S. PATENT DOCUMENTS

| | | | | |
|---|---|---|---|---|
| 11,097,420 | B2 | 8/2021 | Fujii et al. | |
| 2011/0035053 | A1* | 2/2011 | Guochunxu | B25J 9/1664 700/255 |
| 2016/0016312 | A1* | 1/2016 | Lawrence, III | B25J 9/1671 901/41 |
| 2016/0297072 | A1* | 10/2016 | Williams | G05D 1/0234 |
| 2017/0273748 | A1* | 9/2017 | Hourtash | B25J 9/1607 |
| 2018/0036882 | A1* | 2/2018 | Kimura | B25J 9/1664 |
| 2019/0240833 | A1* | 8/2019 | Kimura | B25J 9/1664 |

FOREIGN PATENT DOCUMENTS

| | | | |
|---|---|---|---|
| JP | 9-34524 | A | 2/1997 |
| JP | 9-201784 | A | 8/1997 |
| JP | 2006-43862 | A | 2/2006 |
| JP | 2012-56026 | A | 3/2012 |
| JP | 2017-170581 | A | 9/2017 |
| JP | 2020-199571 | A | 12/2020 |
| JP | 2021-65940 | A | 4/2021 |
| WO | WO 2016/103297 | A1 | 6/2016 |

* cited by examiner

*Primary Examiner* — Arslan Azhar
(74) *Attorney, Agent, or Firm* — Oblon, McClelland, Maier & Neustadt, L.L.P.

(57) ABSTRACT

A method for generating a movement route of a robot having a plurality of motion axes includes the steps of disposing a virtual area near the robot in accordance with each of a plurality of attitudes at an operation position of the robot, determining interference between the robot and the virtual area and between the robot and a surrounding environment, and generating the movement route of the robot while evaluating each of the plurality of attitudes on a basis of a result of the step of determining. In the step of generating, an attitude with which no interference with the virtual area is caused is highly evaluated.

11 Claims, 8 Drawing Sheets

METHOD FOR GENERATING MOVEMENT ROUTE OF ROBOT, MOVEMENT ROUTE GENERATION APPARATUS, ROBOT SYSTEM, AND PROGRAM

BACKGROUND OF THE INVENTION

1. Field of the Invention

The present invention relates to a method for generating a movement route of a robot, a movement route generation apparatus, a robot system, and a program.

2. Description of the Related Art

Robots that perform certain operations on workpieces have been widely used in various industrial fields as a result of development thereof. Such a robot includes an arm and adjusts a position of a tip of the arm for performing a certain operation by controlling an attitude of the arm and a movement route of the arm. When an attitude of a robot and a route for a series of motions are controlled, safety needs to be secured by preventing a collision between the robot and a nearby object in consideration of effects of nearby obstacles and the like along with a state of a workpiece.

Japanese Unexamined Patent Application Publication No. 9-34524, for example, discloses a method in which a robot generates a movement route thereof using no-entry areas created to keep a certain distance from obstacles in order to avoid interference with the obstacles. Japanese Unexamined Patent Application Publication No. 9-201784 discloses a method for generating a position and an attitude of a robot for securing a space between the robot and an obstacle using evaluation functions, which are parameters based on positions of axes of the robot and a margin of a distance between the robot and the obstacle.

SUMMARY OF THE INVENTION

With the method disclosed in Japanese Unexamined Patent Application Publication No. 9-34524, interference between a tip of an end effector of a robot and an obstacle can be avoided. This method, however, does not take into consideration how to keep a certain distance between each of parts of a robot and an obstacle. With the method disclosed in Japanese Unexamined Patent Application Publication No. 9-201784, an attitude that cannot be achieved by a robot might be selected and a movement route with poor operability might be created in order to select a position and an attitude of the robot that will maximize a margin distance. As a result, a movement route of the robot with which the robot achieves appropriate attitudes might not be generated.

In view of the above problems, the present invention aims to generate an appropriate movement route of a robot while preventing a collision during operation of the robot.

In order to address the above problems, the present invention includes the following configuration. That is, a method for generating a movement route of a robot having a plurality of motion axes, includes the steps of disposing a virtual area near the robot in accordance with each of a plurality of attitudes at an operation position of the robot, determining interference between the robot and the virtual area and between the robot and a surrounding environment, and generating the movement route of the robot while evaluating each of the plurality of attitudes on a basis of a result of the step of determining. In the step of generating, an attitude with which no interference with the virtual area is caused is highly evaluated.

Another aspect of the present invention includes the following configuration. That is, a movement route generation apparatus that generates a movement route of a robot having a plurality of motion axes includes disposition means for disposing a virtual area near the robot in accordance with each of a plurality of attitudes at an operation position of the robot, determination means for determining interference between the robot and the virtual area and between the robot and a surrounding environment, and generation means for generating the movement route of the robot while evaluating each of the plurality of attitudes on a basis of a result of the determination made by the determination means. The generation means highly evaluates an attitude with which no interference with the virtual area is caused.

Another aspect of the present invention includes the following configuration. That is, a robot system includes a robot having a plurality of motion axes and a movement route generation apparatus. The movement route generation apparatus includes disposition means for disposing a virtual area near the robot in accordance with each of a plurality of attitudes at an operation position of the robot, determination means for determining interference between the robot and the virtual area and between the robot and a surrounding environment, and generation means for generating the movement route of the robot while evaluating each of the plurality of attitudes on a basis of a result of the determination made by the determination means. The generation means highly evaluates an attitude with which no interference with the virtual area is caused.

Another aspect of the present invention includes the following configuration. That is, a program causes a computer to perform a process including the steps of disposing a virtual area near a robot having a plurality of motion axes in accordance with each of a plurality of attitudes at an operation position of the robot, determining interference between the robot and the virtual area and between the robot and a surrounding environment, and generating the movement route of the robot while evaluating each of the plurality of attitudes on a basis of a result of the step of determining. In the step of generating, an attitude with which no interference with the virtual area is caused is highly evaluated.

According to the present invention, an appropriate movement route can be generated while preventing a collision during operation of a robot.

DESCRIPTION OF THE PREFERRED EMBODIMENTS

Figure 1:
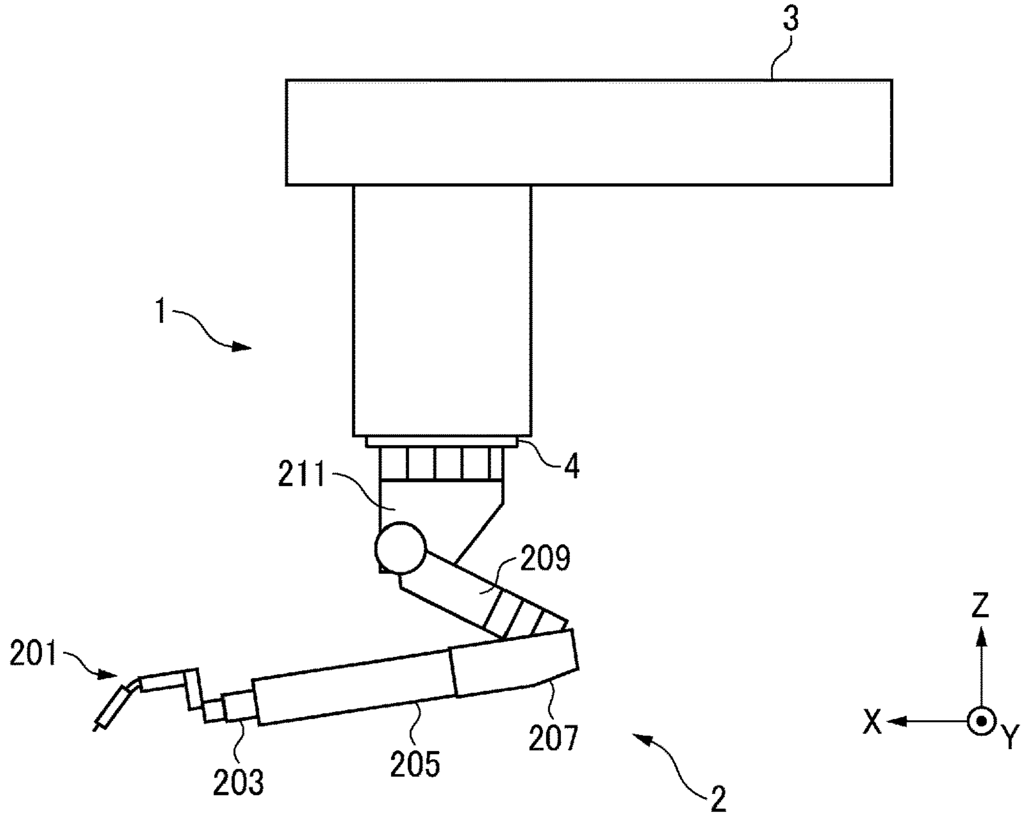
FIG. 1 is a schematic diagram illustrating a schematic configuration of a ceiling-mounted robot system according to an embodiment of the present invention.

Embodiments of the present invention will be described hereinafter with reference to the drawings and the like. The embodiments that will be described hereinafter are ones for describing the present invention and not intended to limit interpretations of the present invention, and not all components described in each of the embodiments are essential for solving the problems addressed by the present invention. In the drawings, the same components are given the same reference numerals to indicate correspondences. Although components of a robot and connections between parts of the robot are partly simplified or omitted in the drawings referred to in the following description, this is not intended to limit interpretations.

First Embodiment

In the present embodiment, a ceiling-mounted welding system (hereinafter also referred to as a "robot system") will be described as an example of a system to which the present invention can be applied. The system to which the present invention can be applied, however, is not limited to this, and the present invention can be applied to any robot system that includes a robot including an arm movable along a plurality of axes, namely six axes, for example, and that sets a route of the robot in order to adjust a position of a tip of the arm in accordance with a certain operation. Apparatuses included in the system according to the present embodiment are not particularly limited, and the system may include at least apparatuses having functions according to the present embodiment.

XYZ Cartesian coordinate systems, which are three-dimensional coordinate systems each defined by an X-axis, a Y-axis, and a Z-axis, illustrated in the drawings used in the following description correspond to one another. The XYZ Cartesian coordinate systems may be the same as a robot coordinate system for the robot system, or may be different from the robot coordinate system and associated with the robot coordinate system through a coordinate transformation.

Example of Configuration of System

FIG. 1 is a schematic diagram illustrating a schematic configuration of the robot system according to the present embodiment. A robot system 1 according to the present embodiment performs a certain operation with a tool provided for a tip thereof on the basis of an instruction from a control apparatus such as an information processing apparatus 300, which will be described later. In the case of a welding system, the certain operation is welding, and the tool is a welding torch or the like. The configuration described here is an example, and in the case of a welding system as in the present embodiment, for example, the robot system 1 may further include a power supply apparatus that supplies welding power, a wire feeding apparatus that feeds wire to a robot, an imaging apparatus that captures an image of a scene around a welding position, sensors for detecting various pieces of information, and a positioner that holds a workpiece to be welded and that controls an attitude of the workpiece, all of which are not illustrated.

The ceiling-mounted robot system 1 illustrated in FIG. 1 includes a robot 2 and a slider 3. The robot 2 is a vertically articulated six-axis robot mounted on the slider 3. The slider 3 is mounted on a ceiling, a frame, or the like and allows the robot 2 to move on an XY plane, that is, in horizontal directions, and in a Z-axis direction, that is, in vertical directions.

Figure 2:
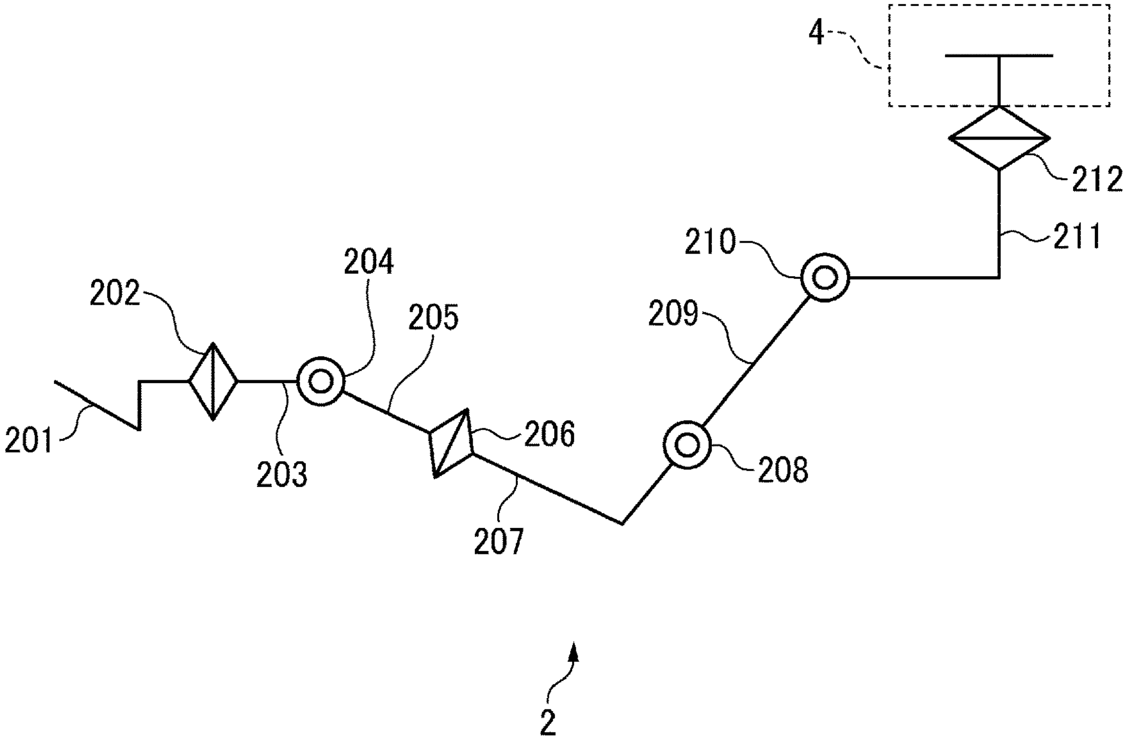
FIG. 2 is a schematic diagram illustrating motion axes of a robot according to the embodiment of the present invention.

The robot 2 according to the present embodiment has a plurality of, namely six, motion axes, that is, rotation axes. As illustrated in FIGS. 1 and 2, the robot 2 has a first axis 212, a second axis 210, a third axis 208, a fourth axis 206, a fifth axis 204, and a sixth axis 202 in order of proximity from a mounting base 4, which is a connection to the slider 3. The first axis 212, which is closest to the mounting base 4, will also be referred to as a "robot origin". The robot 2 also has a first link 211, a second link 209, a third link 207, a fourth link 205, a fifth link 203, and a sixth link 201 in order of proximity from the mounting base 4. A J-th link corresponds to a rigid member connecting a J-th axis and a (J+1)th axis. The sixth link 201 at the tip of the robot 2 is provided with the tool for performing the certain operation.

In the following description, the tip of the robot 2, that is, the sixth link 201, is located in a forward direction, and an opposite direction is defined as a backward direction. The slider 3 is located in an upward direction of the robot 2, and an opposite direction is defined as a downward direction. The forward, backward, upward, and downward directions of the robot 2 can change depending on an attitude, a mounting position, or the like of the robot 2.

Figure 3:
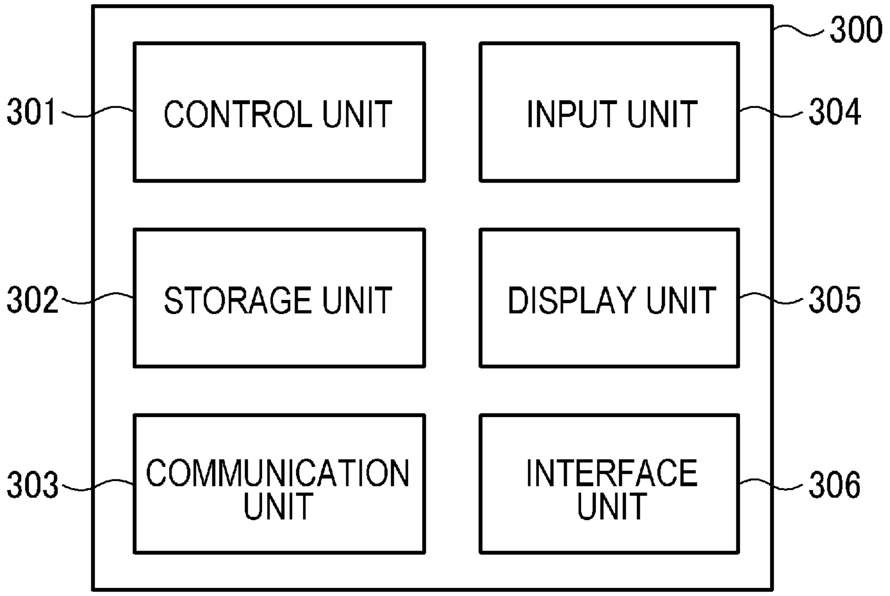
FIG. 3 is a block diagram illustrating a schematic configuration of an information processing apparatus according to the embodiment of the present invention.

FIG. 3 is a block diagram illustrating a schematic configuration of the information processing apparatus 300 available as the control apparatus for controlling the robot system 1 according to the present embodiment. That is, the information processing apparatus 300 has a configuration available as that of a movement route generation apparatus according to the present embodiment. The information processing apparatus 300 includes a control unit 301, a storage unit 302, a communication unit 303, an input unit 304, a display unit 305, and an interface unit 306.

The control unit 301 may be achieved by, for example, a central processing unit (CPU), a graphical processing unit (GPU), a microprocessor unit (MPU), a digital signal processor (DSP), and/or a field-programmable gate array (FPGA). The storage unit 302 is, for example, a volatile or nonvolatile storage device such as a hard disk drive (HDD), a read-only memory (ROM), or a random-access memory (RAM). The control unit 301 achieves various processes that will be described later by loading and executing various programs stored in the storage unit 302.

The communication unit 303 is a component for communicating with external apparatuses and various sensors. The communication unit 303 may perform wired or wireless communication and employ any communication standard. The input unit 304 is an input device for inputting various pieces of information to the information processing apparatus 300 and may be, for example, a plurality of input switches, a keyboard and a mouse, or the like to which certain functions are assigned.

The display unit 305 is a display device for displaying various pieces of information and may be a display device such as a cathode-ray tube (CRT) display, a liquid crystal display (LCD), or an organic electroluminescent (EL) display. The display unit 305 may display, for example, commands and data input from the input unit 304 and various pieces of information generated by the information processing apparatus 300. The input unit 304 and the display unit 305 may be together achieved by a touch panel display.

The interface unit 306 is a component that is connected to the robot system 1 and other external apparatuses and that communicates data with the external apparatuses. The interface unit 306 may be, for example, an interface circuit based on RS-232C, which is a serial communication standard, an interface circuit based on universal serial bus (USB), or the like. The components of the information processing apparatus 300 are communicably connected to one another by an internal bus or the like.

The control apparatus of the robot system 1 may be provided as discrete apparatuses in order to control the robot 2, the slider 3, and other components (e.g., the positioner) and together achieve the control. Alternatively, one control apparatus for singlehandedly controlling the robot 2, the slider 3, and the other components may be provided.

Virtual Area

Next, a virtual area used when a movement route of the robot 2 according to the present embodiment is generated will be described. The "movement route" in the present embodiment includes a route of an operation position of the tip of the robot 2, that is, the tool, and movement ranges of positions of the arm and the other components of the robot 2. That is, the "movement route" includes the entirety of a three-dimensional space where the components are located as a result of movement of the links and the axes illustrated in FIGS. 1 and 2. A shape of the virtual area is not particularly limited, and may be linear, planar, or block-shaped. The virtual area is preferably a virtual block.

In the present embodiment, interference with nearby obstacles is determined by setting a certain virtual area for the attitude and the position of the robot 2. More specifically, coordinates of the position of the robot 2 along the X, Y, and Z-axis adjusted by the slider 3 are also taken into consideration, but the robot 2, not the mounting base 4, will be focused upon here in order to simplify description. In the present embodiment, "obstacles" include all objects that are located inside a range where the robot 2 can move or be disposed and that can interfere, that is, come into contact, with the robot 2.

Figure 4A:
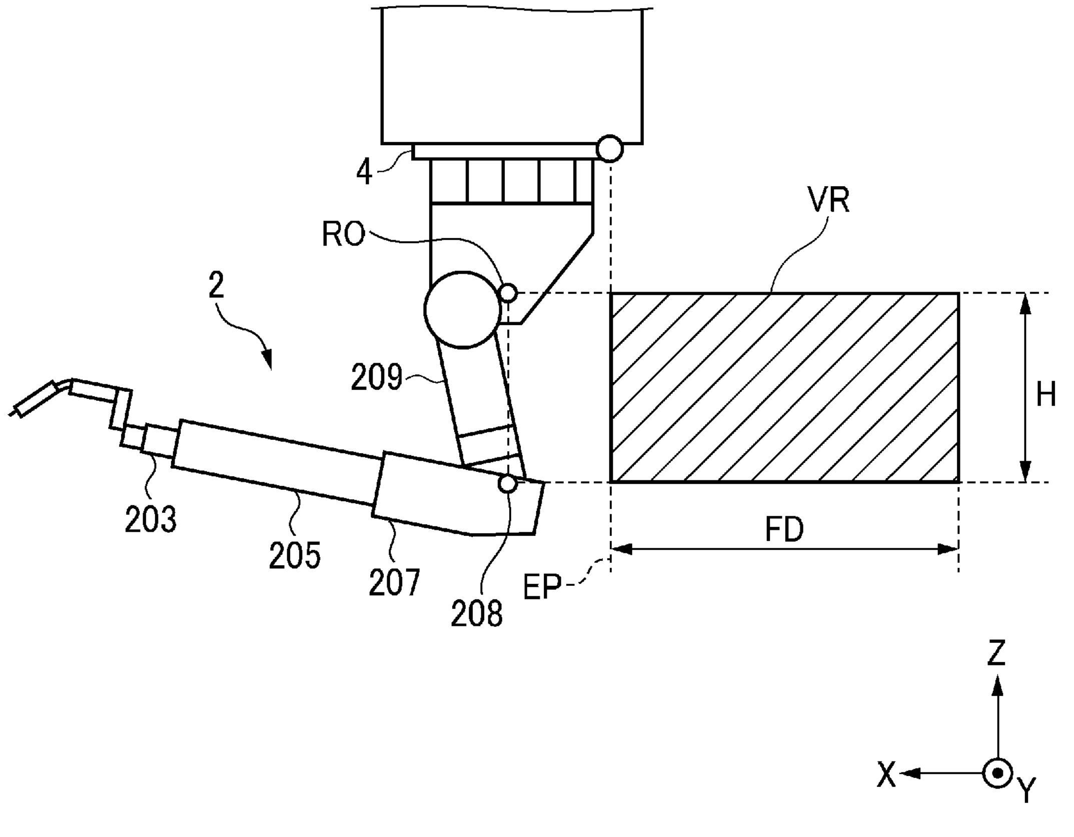
FIG. 4A is a schematic diagram illustrating a virtual area set near the robot according to the embodiment of the present invention.
Figure 4B:
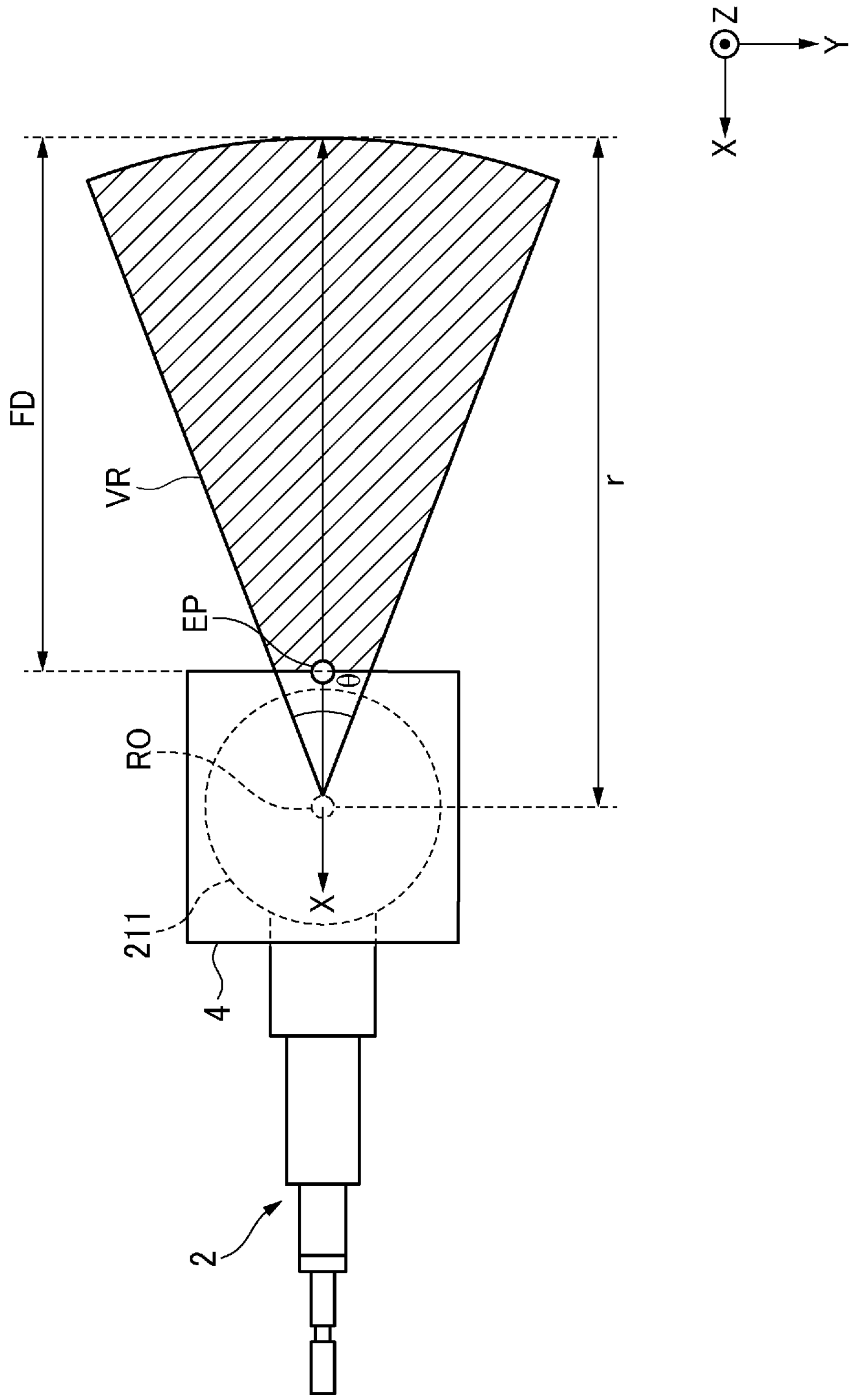
FIG. 4B is another schematic diagram illustrating the virtual area set near the robot according to the embodiment of the present invention.
Figure 4C:
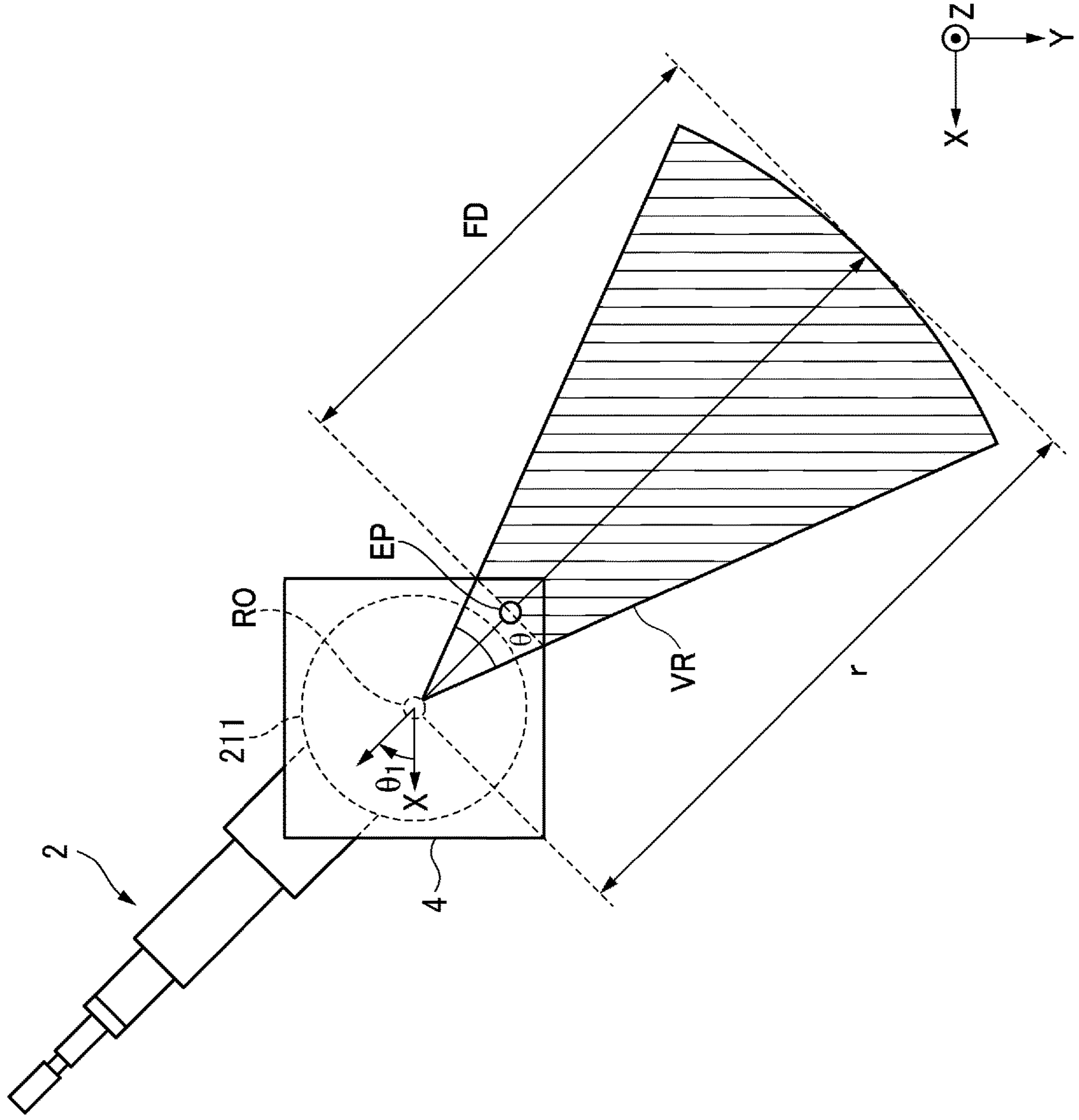
FIG. 4C is another schematic diagram illustrating the virtual area set near the robot according to the embodiment of the present invention.

FIGS. 4A, 4B, and 4C are conceptual diagrams illustrating a case where a certain virtual area VR is set for the robot 2. In each of the drawings referred to in the following description, the virtual area VR set in accordance with the attitude of the robot 2 is indicated by hatching.

FIG. 4A is a diagram illustrating the robot 2 viewed along the Y-axis and illustrates a state before the robot 2 changes the attitude thereof through rotation or the like. It is assumed that, in this state, the tip of the robot 2 is directed to a direction along the X-axis as the forward direction. FIG. 4B is a diagram illustrating the robot 2 viewed from above in the Z-axis direction in the same state as in FIG. 4A. Here, a robot origin RO corresponding to the first axis 212 is used as a reference.

In an attitude of the robot 2, a rearmost position of the robot 2 in a direction (an X-axis direction in the example illustrated in FIGS. 4A and 4B) to which the tip of the robot 2 is directed is set as a rearmost end EP. In other words, a position of an end opposite the sixth link 201, which is the tip of the robot 2, is defined as the rearmost end EP. FIGS. 4A and 4B illustrate an example where an end of the mounting base 4 along the X-axis is set as the rearmost end EP.

Furthermore, as illustrated in FIGS. 4A and 4B, a fan-shaped area whose radius is r and whose central angle is θ is set using the robot origin RO as a reference. A reference position of the central angle θ, that is, a central position, is located in a direction opposite the tip of the robot 2. When the tip of the robot 2 is directed in the X-axis direction, for example, the radius r and the central angle θ are set using the X-axis as a reference. In the radius r of the fan shape, a distance between the rearmost end EP and an arc of the fan shape is defined as a margin distance FD. Furthermore, as illustrated in FIG. 4A, a distance between the robot origin RO in the Z-axis direction and the third axis 208 is defined as a margin height H. In FIG. 4A, an approximate position of the third axis 208 is indicated by a circle. In the present embodiment, interference with obstacles is determined using an area defined by the margin distance FD and the margin height H as the virtual area VR along with areas of the actual components of the robot 2.

FIG. 4C is a diagram illustrating the robot 2 viewed from above in the Z-axis direction and illustrates a state achieved by rotating the robot 2 from the attitude illustrated in FIGS. 4A and 4B by a rotation angle θ1 about the Z-axis using the robot origin RO as a reference. The virtual area VR also rotates about the Z-axis by θ1 using the robot origin RO as a reference in conjunction with the rotation of the robot 2. The margin distance FD at this time is the same as in FIG. 4B.

Although a pillar-shaped virtual area VR having a fan-shaped bottom surface is taken as an example in the present embodiment, the shape of the virtual area VR is not limited to this, and may have another shape, instead. In addition, although an example where the virtual area VR is provided behind the robot 2 is described in the present embodiment, a position of the virtual area VR is not limited to this, and the virtual area VR may be provided at another position, instead. Other examples of the configuration of the virtual area VR will be described later.

Figure 5A:
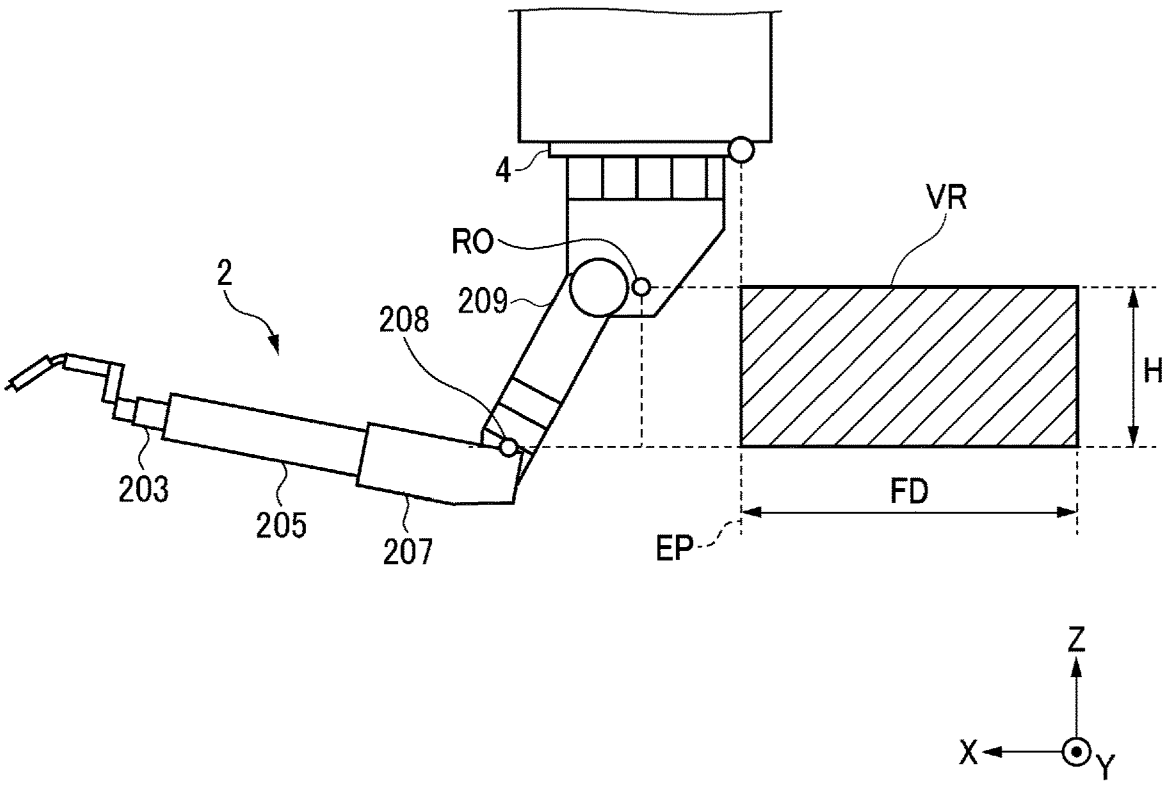
FIG. 5A is a schematic diagram illustrating another virtual area set near the robot according to the embodiment of the present invention.
Figure 5B:
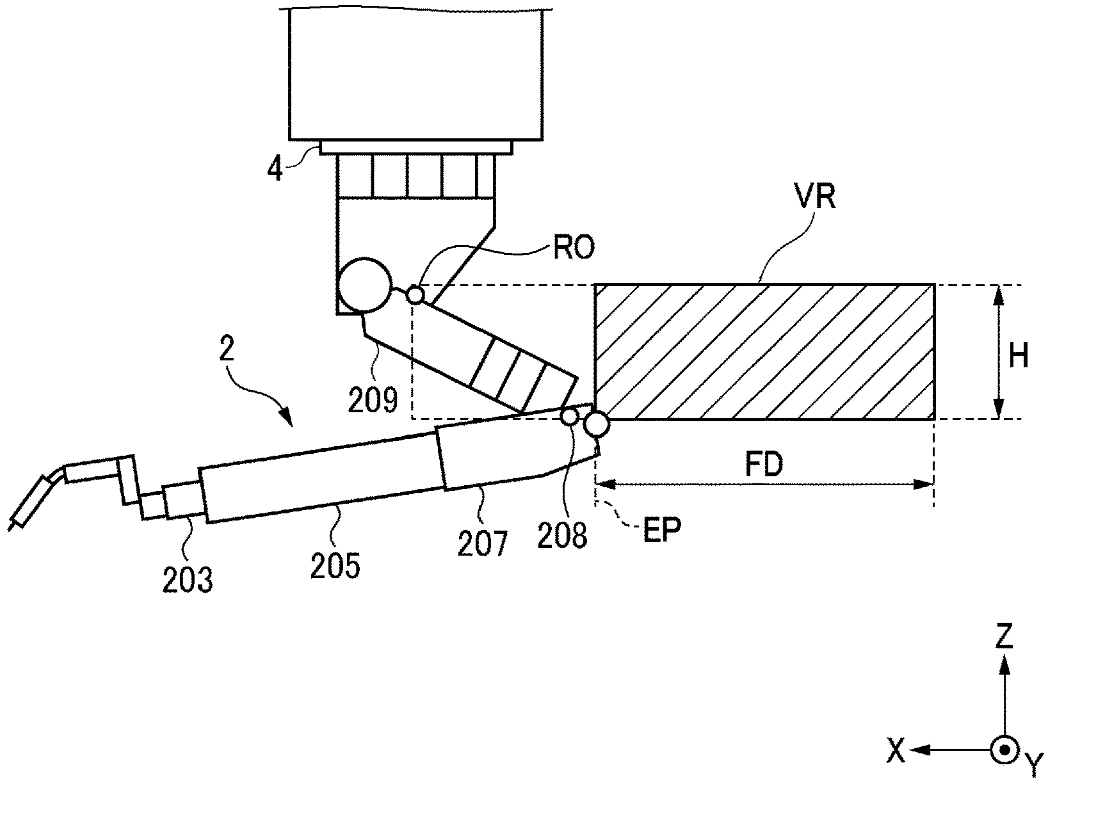
FIG. 5B is another schematic diagram illustrating the other virtual area set near the robot according to the embodiment of the present invention.

Furthermore, in the present embodiment, the virtual area VR changes depending on the attitude of the robot 2. FIGS. 5A and 5B are schematic diagrams illustrating examples where the virtual area VR changes in accordance with the attitude of the robot 2. FIGS. 5A and 5B, as with FIG. 4A, schematically illustrate the robot 2 viewed in a Y-axis direction in a state where the tip of the robot 2 is directed in the X-axis direction. At this time, when viewed along the Z-axis, a relationship between the direction to which the tip of the robot 2 is directed and the X-axis is the same as in FIG. 4C. FIG. 5A illustrates a state where the robot 2 extends forward. FIG. 5B illustrates a state where the robot 2 folds up.

A position of the rearmost end EP in the attitude illustrated in FIG. 5A is the same as that in the attitude illustrated in FIG. 4A, but a position of the third axis 208 along the X-axis is different. The margin distance FD, therefore, is the same, but the margin height H is smaller than in FIG. 4A. As a result, the virtual area VR in the attitude illustrated in FIG. 5A is different from that in the attitude illustrated in FIG. 4A, that is, the virtual area VR in the attitude illustrated in FIG. 5A is smaller than that in the attitude illustrated in FIG. 4A.

In the attitude illustrated in FIG. 5B, the position of the rearmost end EP is located further rearward compared to the attitude illustrated in FIG. 4A. The position of the third axis 208 along the X-axis, too, is different from that in FIG. 4A. The margin distance FD and the margin height H, therefore, are smaller than in the state illustrated in FIG. 4A. As a result, the virtual area VR in the attitude illustrated in FIG. 5B is different from those in the attitudes illustrated in FIGS. 4A and 5A and smaller than in the attitude illustrated in FIG. 5A.

In the present embodiment, when the virtual area VR is set, parameters such as radius, coordinates and points used as references, and directions and a position of the virtual area VR are specified in advance. Values and items of the parameters to be specified are not particularly limited, and may differ depending on the shape and the position of the virtual area VR used. In addition, although an example where the third axis 208 is used as a reference is described in the present embodiment, the reference used is not limited to this. A motion axis to be used as a reference among the plurality of motion axes included in the robot 2 may be changed as necessary. Which motion axis among the plurality of motion axes, relative to which the position and rotation of the robot 2 are determined, is to be used as a reference for changes in the virtual area VR may change as necessary. The virtual area VR may be changed in association with the attitude of the arm of the robot 2, instead of using a motion axis as a reference.

Process for Generating Movement Route

Figure 6:
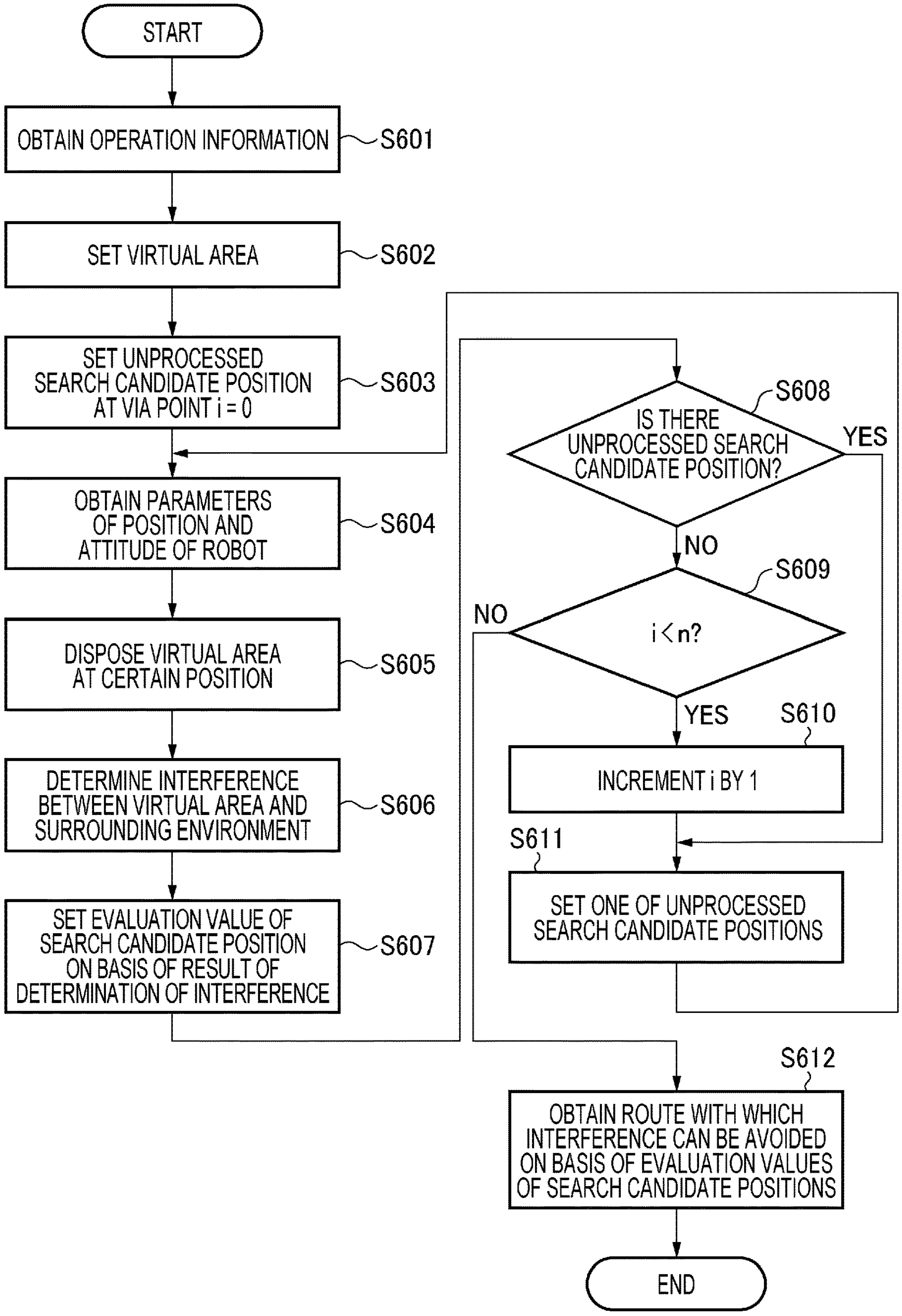
FIG. 6 is a flowchart illustrating a process for finding a movement route according to the embodiment of the present invention.

A process for generating a movement route according to the present embodiment will be described hereinafter. FIG. 6 is a flowchart illustrating an overall procedure of the process for generating a movement route according to the present embodiment. Each of steps is achieved through cooperation between the components of the information processing apparatus 300 illustrated in FIG. 3 and performed by loading and executing applications stored in the storage unit 302 of the information processing apparatus 300 using the control unit 301. This process flow may be performed by the information processing apparatus 300 to generate a movement route of the robot 2, for example, before the robot 2 is actually moved to perform an operation. Here, it is assumed that the information processing apparatus 300 performs all processing, in order to simplify description.

It is assumed that, before the process flow starts, operation information, which is information regarding an operation performed using the tool provided at the tip of the robot 2, is specified. In the case of a welding robot, for example, the operation information may include a position of a welding line indicating welding positions, a welding direction, and an attitude of a workpiece. It is also assumed that information regarding parameters relating to the robot coordinate system of the robot 2, specifications indicating dimensions of the components, and the like is set in advance.

It is also assumed that information regarding obstacles near the robot 2 is set in advance. The information regarding obstacles may be indicated as a three-dimensional environment model simulating the obstacles. The obstacles may be, for example, devices including the control apparatus, cables provided for the robot 2, and the like near the robot 2. The obstacles may also include various objects in a surrounding environment that can come into contact with the robot 2 inside a range where the robot 2 can move.

In step S601, the information processing apparatus 300 obtains set operation information. The operation information may be obtained by reading data stored in the storage unit 302 or receiving an input from a user of the information processing apparatus 300.

In step S602, the information processing apparatus 300 obtains parameters relating to the virtual area VR and sets the virtual area VR. In the example described with reference to FIG. 4C and the like, parameters for setting the virtual area VR, such as the radius r and the central angle θ, are obtained.

In step S603, the information processing apparatus 300 refers to the operation information and identifies a first via point of an operation position of the robot 2. Here, the operation is sequentially performed for a plurality of via points $P_i$ (i=0, 1, 2, . . . , and n). In the case of a welding robot, for example, welding positions are set on the welding line, along which welding is to be performed, as the plurality of via points, and the welding is performed with the welding robot moving from a via point to another. The first via point is denoted by $P_0$ and set. Furthermore, the information processing apparatus 300 identifies attitudes that can be achieved by the robot 2 when the operation is performed for a via point $P_i$. Since the robot 2 has the plurality of rotation axes as described with reference to FIGS. 1 and 2, the robot 2 can achieve one or a plurality of attitudes when performing the operation for a via point (the via point $P_0$ at this point). A most appropriate attitude, therefore, needs to be identified from the attitudes. The information processing apparatus 300 sets, among the one or plurality of attitudes that can be achieved, an unprocessed attitude as a search candidate position to be focused upon.

In step S604, the information processing apparatus 300 obtains parameters of the attitude corresponding to the set search candidate position. The parameters may include, for example, correspondence between the robot coordinate system and a world coordinate system and coordinates, directions, and angles of the components of the robot 2 in each of the coordinate systems.

In step S605, the information processing apparatus 300 disposes the virtual area VR set in step S602 near the robot 2 on the basis of the parameters obtained in step S604. A position at which the virtual area VR is disposed is, for example, behind the robot 2 relative to the robot origin RO and the third axis 208, which are references, in the example illustrated in FIGS. 4A to 4C.

In step S606, the information processing apparatus 300 determines whether there is interference on the basis of the virtual area VR set in step S605 and the information regarding the obstacles in the surrounding environment. If ranges indicated by different sets of coordinates overlap each other, for example, the information processing apparatus 300 may determine that there is interference. At this time, the information processing apparatus 300 determines not only interference between the virtual area VR and the obstacles but also interference between the components of the robot 2 and the obstacles. A method for determining interference is not particularly limited, and a known method may be used.

In step S607, the information processing apparatus 300 evaluates the search candidate position that is being focused upon on the basis of a result of the determination in step S606 and sets an evaluation value. An evaluation method is not particularly limited. For example, three-level evaluation (0 to 2 points) is performed. If the information processing apparatus 300 determines that there is no interference between the virtual area VR and the obstacles, 2 points, which is the highest evaluation value, is set. If the information processing apparatus 300 determines that there is interference between the virtual area VR and the obstacles but there is no interference between the components of the robot 2 and the obstacles, 1 point is set. If the information processing apparatus 300 determines that there is interference between the components of the robot 2 and the obstacles, 0 point, which is the lowest evaluation value, is set. When there is interference between the components of the robot 2 and the obstacles, the attitude is one that cannot be achieved in reality. The information processing apparatus 300 may be configured in such a way as not to be able to set, in step S603, attitudes that cannot be achieved in reality.

In step S608, the information processing apparatus 300 determines whether there is an unprocessed search candidate position, that is, an attitude, for the current via point $P_i$. If there is an unprocessed search candidate position (YES in step S608), the process performed by the information processing apparatus 300 proceeds to step S611. If there is no unprocessed search candidate position (NO in step S608), on the other hand, the process performed by the information processing apparatus 300 proceeds to step S609.

In step S609, the information processing apparatus 300 determines whether i is smaller than n (i<n). n indicates the total number of via points, and when i becomes n after i is counted from 0, the process has been completed for all the via points. If i is smaller than n (YES in step S609), the information processing apparatus 300 determines that there is an unprocessed via point, and the process performed by the information processing apparatus 300 proceeds to step S610. If i is larger than or equal to n (NO in step S609), on the other hand, the information processing apparatus 300 determines that there is no unprocessed via point, and the process performed by the information processing apparatus 300 proceeds to step S612.

In step S610, the information processing apparatus 300 increments i by 1. That is, subsequence processing is performed for a next via point $P_i$. The process performed by the information processing apparatus 300 then proceeds to step S611.

In step S611, the information processing apparatus 300 identifies one or a plurality of attitudes that can be achieved by the robot 2 when performing the operation for the via point $P_i$ that is being focused upon. Furthermore, the information processing apparatus 300 sets, among the one or plurality of attitudes that can be achieved by the robot 2, an unprocessed attitude as a search candidate position. The process performed by the information processing apparatus 300 then returns to step S604, and subsequent processing is repeated.

In step S612, the information processing apparatus 300 identifies a movement route of the robot 2 with which interference can be avoided on the basis of the evaluation values of interference determined for each of the via points $P_i$ (i=0, 1, . . . ). At this time, the movement route may be identified in consideration of evaluation values for previous positions (e.g., in the case of $P_i$, evaluation values for $P_{i-1}$ and $P_{i-2}$) in addition to the evaluation values for $P_i$. An attitude whose evaluation value is the second highest for $P_i$ among attitudes that can be achieved at $P_i$ may be selected, for example, if the robot 2 needs to make an unnecessary move from an attitude whose evaluation value is the highest for $P_{i-1}$, which is a previous via point, to achieve an attitude whose evaluation value is the highest for $P_i$. Whether the robot 2 needs to make an unnecessary move may be determined, for example, on the basis of the amount of change in each of the rotation axes, the number of rotation axes, among the plurality of rotation axes, that will change, continuity of the movement route, and the like. As a result, the information processing apparatus 300 generates the movement route of the robot 2 for moving through a movement route including the plurality of via points. The process flow then ends.

As described above, according to the present embodiment, a movement route including appropriate attitudes can be generated while preventing a collision during operation of a robot.

Other Embodiments

As illustrated in FIGS. 4A to 4C, a mode in which a pillar-shaped virtual area having a fan-shaped bottom surface is set behind the robot 2 has been described in the above embodiment. Setting of another virtual area will be described. In this embodiment, a mode in which a virtual area having a shape of a rectangular parallelepiped is set below the robot 2 will be described.

Figure 7A:
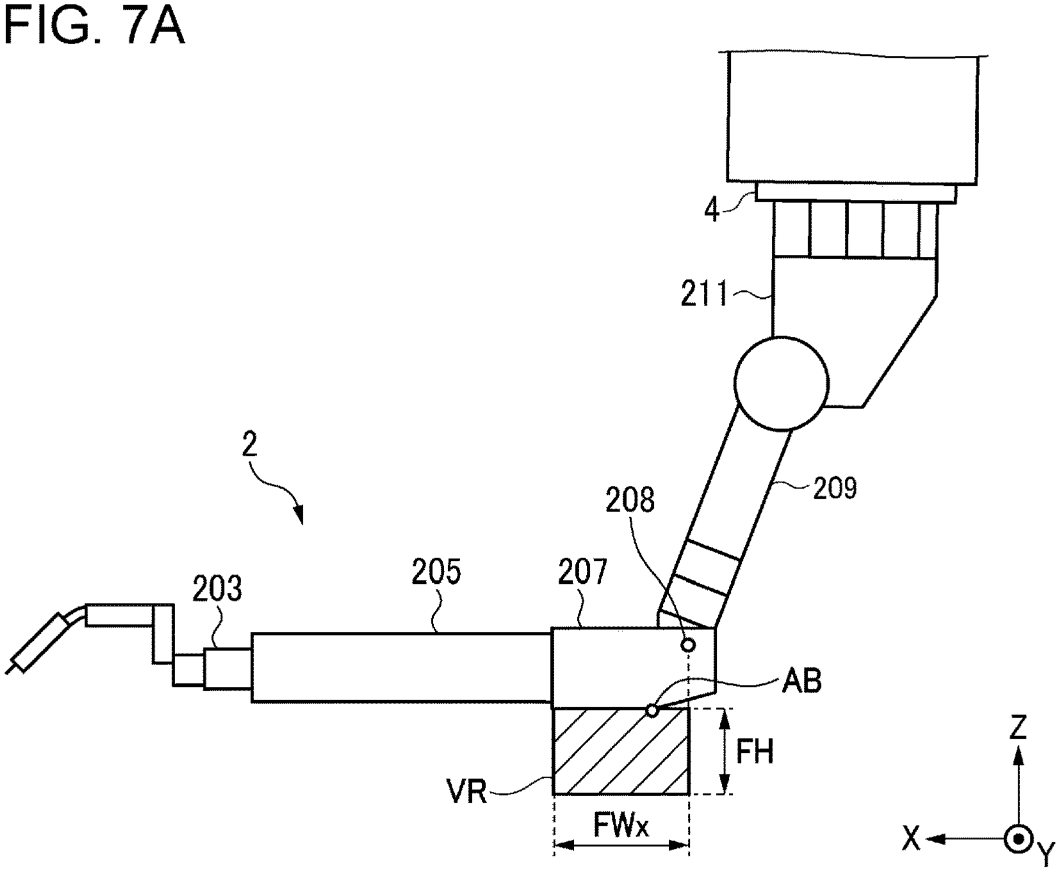
FIG. 7A is a schematic diagram illustrating a virtual area set near a robot according to another embodiment of the present invention.
Figure 7B:
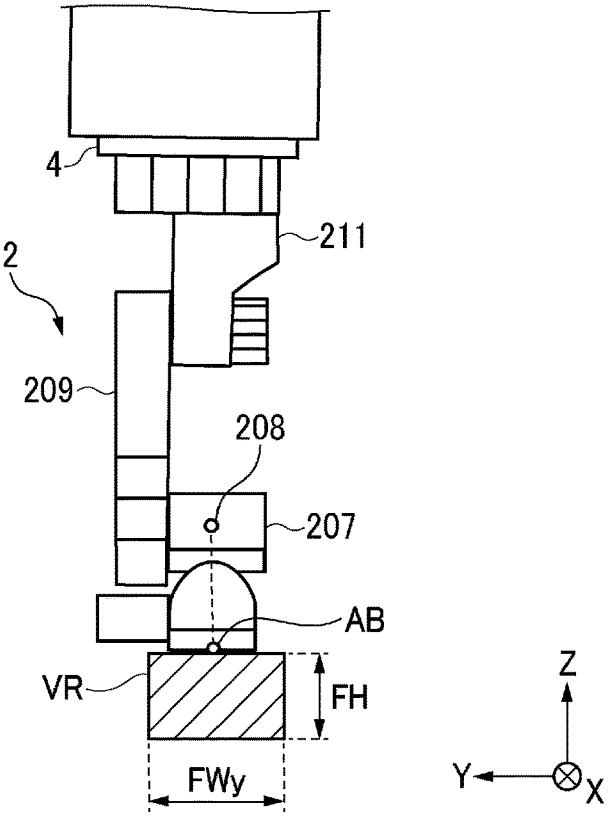
FIG. 7B is another schematic diagram illustrating the virtual area set near the robot according to the other embodiment of the present invention.

FIGS. 7A and 7B are conceptual diagrams illustrating a certain virtual area VR set for the robot 2 under conditions different from those in the first embodiment. FIG. 7A is a diagram illustrating the robot 2 viewed in the Y-axis direction. FIG. 7B is a diagram illustrating the robot 2 viewed from behind along the X-axis.

First, in an attitude of the robot 2, a bottom surface of the arm of the robot 2 in the Z-axis direction is set as an arm bottom surface AB. The arm bottom surface AB may have a certain range in accordance with a shape of the robot 2. A virtual area VR defined by a margin width FWx, a margin width FWy, and a margin height FH, which correspond to the X, Y, and Z-axes, respectively, is disposed in such a way as to be in contact with the arm bottom surface AB. As illustrated in FIG. 7B, the center of the virtual area VR in the Y-axis direction matches the third axis 208. The margin width FWx, the margin width FWy, and the margin height FH may be specified in advance in accordance with the configuration of the robot 2. Although not illustrated in FIGS. 7A and 7B, a shape of the virtual area VR, namely the margin height FH, for example, may change depending on a distance between the third axis 208 and the robot origin RO as described in the first embodiment.

By determining interference as described in the first embodiment using such a virtual area, a movement route with sufficient margins for suppressing interference with obstacles also in an area below the robot 2 can be obtained.

The number of virtual areas to be set is not limited to one, and virtual areas may be set, for example, behind, above, below, and beside the robot 2. A shape of a virtual area is not limited to a particular one, and may change in accordance with a position at which the virtual area is set. At this time, as described in the first embodiment, the shape and dimensions of the set virtual area may change in accordance with the attitude of the robot 2.

A user of the robot system 1 may specify, as desired using the information processing apparatus 300, a position at which a virtual area is set, dimensions of the virtual area, and the like. The set virtual area may be adjusted in accordance with a movable range of the slider 3.

The present embodiment can also be achieved through a process where a program or an application for achieving the functions of the above-described one or more embodiments is supplied to a system or an apparatus using a network, a storage medium, or the like and one or more processors of a computer of the system or the apparatus loads and executes the program or the application.

Alternatively, the present embodiment may be achieved by a circuit that achieves one or more functions. The circuit that achieves one or more functions may be, for example, an application-specific integrated circuit (ASIC) or a field-programmable gate array (FPGA).

As described above, the following are disclosed herein.

(1) A method for generating a movement route of a robot having a plurality of motion axes, the method including the steps of:

disposing a virtual area near the robot in accordance with each of a plurality of attitudes at an operation position of the robot;

determining interference between the robot and the virtual area and between the robot and a surrounding environment; and generating the movement route of the robot while evaluating each of the plurality of attitudes on a basis of a result of the step of determining, in which, in the step of generating, an attitude with which no interference with the virtual area is caused is highly evaluated.

With this configuration, an appropriate movement route can be generated while avoiding a collision during operation of the robot.

(2) The method according to (1), in which the virtual area changes in conjunction with a change in a position and rotation of a certain one of the plurality of motion axes.

With this configuration, the virtual area can be changed and set in accordance with a change in the position and the rotation of the certain one of the plurality of motion axes of the robot.

(3) The method according to (2), in which a plurality of virtual areas are disposed, and in which each of the plurality of virtual areas changes, when changing in conjunction with changes in positions and rotation of the plurality of motion axes, differently in accordance with a position at which the virtual area is disposed.

With this configuration, a movement route with which a collision of the robot can be prevented can be generated by disposing the plurality of virtual areas near the robot.

(4) The method according to (1), in which the virtual area has a shape of a pillar having a fan-shaped bottom surface, and in which height of the virtual area changes in conjunction with a change in a position and rotation of a certain one of the plurality of motion axes.

With this configuration, interference can be determined while changing the virtual area in conjunction with a change in the position and the rotation of the pillar-shaped virtual area having a fan-shaped bottom surface. Especially since the fan-shaped bottom surface is employed, interference can be determined within a range of the same distance at a certain central angle.

(5) The method according to (1), in which the virtual area has a shape of a pillar having a fan-shaped bottom surface, and in which the virtual area changes in conjunction with a change in an attitude of the robot in a three-dimensional coordinate system.

With this configuration, interference can be determined while changing the pillar-shaped virtual area having a fan-shaped bottom surface in conjunction with a change in the attitude and the rotation of the robot.

(6) The method according to (1), in which the virtual area has a shape of a rectangular parallelepiped.

With this configuration, interference can be determined using the virtual area having a shape of a rectangular parallelepiped.

(7) The method according to (6), in which the virtual area changes in conjunction with a change in an attitude of the robot in a three-dimensional coordinate system.

With this configuration, interference can be determined while changing the virtual area having a shape of a rectangular parallelepiped in conjunction with a change in the attitude and the rotation of the robot.

(8) The method according to (1), in which a shape of the virtual area differs depending on a position at which the robot is disposed.

With this configuration, interference can be determined using the virtual area whose shape differs depending on the position at which the virtual area is disposed.

(9) A movement route generation apparatus that generates a movement route of a robot having a plurality of motion axes, the movement route generation apparatus including:

disposition means for disposing a virtual area near the robot in accordance with each of a plurality of attitudes at an operation position of the robot;

determination means for determining interference between the robot and the virtual area and between the robot and a surrounding environment; and generation means for generating the movement route of the robot while evaluating each of the plurality of attitudes on a basis of a result of the determination made by the determination means, in which the generation means highly evaluates an attitude with which no interference with the virtual area is caused.

With this configuration, an appropriate movement route can be generated while preventing a collision during operation of the robot.

(10) A robot system including:

a robot having a plurality of motion axes; and the movement route generation apparatus according to (9).

With this configuration, a robot system capable of generating an appropriate movement route while preventing a collision during operation of the robot can be provided.

(11) A program causing a computer to perform a process including the steps of:

disposing a virtual area near a robot having a plurality of motion axes in accordance with each of a plurality of attitudes at an operation position of the robot;

determining interference between the robot and the virtual area and between the robot and a surrounding environment; and generating the movement route of the robot while evaluating each of the plurality of attitudes on a basis of a result of the step of determining, in which, in the step of generating, an attitude with which no interference with the virtual area is caused is highly evaluated.

With this configuration, an appropriate movement route can be generated while preventing a collision during operation of the robot.

What is claimed is:

1. A method for generating a movement route of a robot having a plurality of motion axes connected from a robot origin, the method comprising:
disposing a virtual area behind a side opposite to a distal end portion of the robot with respect to the robot origin or an arbitrary motion axis in accordance with each of a plurality of attitudes at an operation position of the robot;
determining interference between the robot and the virtual area and between the robot and a surrounding environment;
evaluating each of the plurality of attitudes based on the determining, and setting an evaluation value for each of the plurality of attitudes in which an attitude with which no interference is caused with the virtual area has a predetermined maximum value, an attitude with which interference is caused with a component of the robot and an obstacle in the surrounding environment has a predetermined minimum value, and an attitude with which interference is caused with the virtual area but does not cause interference with the component of the robot and the obstacle in the surrounding environment has a predetermined intermediate value between the predetermined maximum value and the predetermined minimum value;
generating the movement route of the robot based on the evaluation values; and
controlling the robot to move along the movement route.

2. The method according to claim 1,
wherein a shape of the virtual area changes in conjunction with a change in a position and rotation of a certain one of the plurality of motion axes.

3. The method according to claim 2,
wherein a plurality of virtual areas are disposed, and
wherein each of the plurality of virtual areas changes, when changing in conjunction with changes in positions and rotation of the plurality of motion axes, differently in accordance with a position at which the virtual area is disposed.

4. The method according to claim 1,
wherein the virtual area has a shape of a pillar having a fan-shaped bottom surface, and
wherein height of the virtual area changes in conjunction with a change in a position and rotation of a certain one of the plurality of motion axes.

5. The method according to claim 1,
wherein the virtual area has a shape of a pillar having a fan-shaped bottom surface, and
wherein the virtual area changes in conjunction with a change in an attitude of the robot in a three-dimensional coordinate system.

6. The method according to claim 1,
wherein the virtual area has a shape of a rectangular parallelepiped.

7. The method according to claim 6,
wherein the virtual area changes in conjunction with a change in an attitude of the robot in a three-dimensional coordinate system.

8. The method according to claim 1,
wherein a shape of the virtual area differs depending on a position at which the robot is disposed.

9. A movement route generation apparatus that generates a movement route of a robot having a plurality of motion axes, the movement route generation apparatus comprising:
circuitry configured to
dispose a virtual area behind a side opposite to a distal end portion of the robot in accordance with each of a plurality of attitudes at an operation position of the robot;
determine interference between the robot and the virtual area and between the robot and a surrounding environment;
evaluate each of the plurality of attitudes based on the determining, and setting an evaluation value for each of the plurality of attitudes in which an attitude with which no interference is caused with the virtual area has a predetermined maximum value, an attitude with which interference is caused with a component of the robot and an obstacle in the surrounding environment has a predetermined minimum value, and an attitude with which interference is caused with the virtual area but does not cause interference with the component of the robot and the obstacle in the surrounding environment has a predetermined intermediate value between the predetermined maximum value and the predetermined minimum value
generate the movement route of the robot based on the evaluation values; and
control the robot to move along the movement route.

10. A robot system comprising:
a robot having a plurality of motion axes; and
the movement route generation apparatus according to claim 9.

11. A non-transitory computer readable medium storing thereon a program causing a computer to perform a process comprising:
disposing a virtual area behind a side opposite to a distal end portion of the robot with respect to the robot origin or an arbitrary motion axis a robot having a plurality of motion axes in accordance with each of a plurality of attitudes at an operation position of the robot;
determining interference between the robot and the virtual area and between the robot and a surrounding environment;
evaluating each of the plurality of attitudes based on the determining, and setting an evaluation value for each of the plurality of attitudes in which an attitude with which no interference is caused with the virtual area has a predetermined maximum value, an attitude with which interference is caused with a component of the robot and an obstacle in the surrounding environment has a predetermined minimum value, and an attitude with which interference is caused with the virtual area but does not cause interference with the component of the robot and the obstacle in the surrounding environment has a predetermined intermediate value between the predetermined maximum value and the predetermined minimum value;
generating the movement route of the robot based on the evaluation values; and
controlling the robot to move along the movement route.

* * * * *